United States Patent [19]

Hermann

[11] Patent Number: 5,051,179
[45] Date of Patent: Sep. 24, 1991

[54] MEMBRANE FILTER PLATE FOR FILTER PRESSES

[75] Inventor: Manfred P. Hermann, Nürnberg, Fed. Rep. of Germany

[73] Assignee: JV Kunststoffwerk GmbH, Georgensgmünd, Fed. Rep. of Germany

[21] Appl. No.: 399,933

[22] Filed: Aug. 29, 1989

[30] Foreign Application Priority Data

Sep. 1, 1988 [DE] Fed. Rep. of Germany ....... 8811071

[51] Int. Cl.$^5$ .............................................. B01D 25/12
[52] U.S. Cl. .................................... 210/228; 100/211; 210/229; 210/231
[58] Field of Search ............................... 210/227–231, 210/224, 225, 226, 232; 52/202; 160/380, 392, 395; 100/194, 199, 211, 295

[56] References Cited

U.S. PATENT DOCUMENTS

| | | | |
|---|---|---|---|
| 3,656,622 | 4/1972 | Heimbach et al. | 210/231 |
| 3,888,769 | 6/1975 | Schotten et al. | 210/227 |
| 3,931,014 | 1/1976 | Heimbach et al. | 210/231 |
| 4,251,373 | 2/1981 | Nakamura | 210/228 |
| 4,455,209 | 6/1984 | Hermann | 204/279 |
| 4,508,623 | 4/1985 | Heckl et al. | 210/231 |
| 4,608,164 | 8/1986 | Neu | 210/231 |
| 4,617,863 | 10/1986 | Kenyon | 210/228 |
| 4,666,596 | 5/1987 | Oelbermann et al. | 210/228 |
| 4,746,428 | 5/1988 | Junker et al. | 210/231 |
| 4,746,429 | 5/1988 | Stanik | 210/231 |
| 4,749,482 | 6/1988 | Bonn | 210/231 |
| 4,776,955 | 10/1988 | Wildner | 210/228 |
| 4,911,839 | 3/1990 | Davis | 210/231 |

FOREIGN PATENT DOCUMENTS

| | | |
|---|---|---|
| 1960821 | 6/1971 | Fed. Rep. of Germany . |
| 1761524 | 7/1971 | Fed. Rep. of Germany . |
| 2324876 | 12/1974 | Fed. Rep. of Germany . |
| 3220487 | 12/1983 | Fed. Rep. of Germany . |
| 3317235 | 11/1984 | Fed. Rep. of Germany . |
| 3403163 | 8/1985 | Fed. Rep. of Germany . |
| 8614208 | 10/1986 | Fed. Rep. of Germany . |
| 8704934 | 5/1987 | Fed. Rep. of Germany . |
| 1118383 | 1/1967 | United Kingdom . |
| 2069360 | 2/1981 | United Kingdom . |

Primary Examiner—Jay H. Woo
Assistant Examiner—James P. Mackey
Attorney, Agent, or Firm—Spencer & Frank

[57] ABSTRACT

A membrane filter plate for filter presses includes either a membrane holding frame or plate having dovetailed recesses; at least one membrane having an associated covering frame; each membrane and covering frame combination having an associated filter cloth and each membrane edge having a dovetailed-shaped projection which engages in corresponding dovetailed recesses of the membrane holding frame or plate wherein each membrane edge is provided with a flute in the dovetailed-shaped projection and the covering frame is provided with a projection at locations corresponding to the flute which engages with the flute.

7 Claims, 3 Drawing Sheets

MEMBRANE FILTER PLATE FOR FILTER PRESSES

BACKGROUND OF THE INVENTION

The invention relates to a membrane filter plate for filter presses which are composed, in a known manner, of several parts between which are clamped at least one, usually, however, two, flexible rubber or plastic membranes. The membranes are equipped with nubs, grooves or the like on one side and are covered by a filter cloth. Several of such frames are installed in a filter press for use with their flat sides against one another and are pressed against one another. This pressure seals the individual plate packets against one another. The plates are equipped with one or more openings for the influx of the material to be filtered and also with openings for discharge of the filtrate. Additionally, inlets are provided for a pressure medium, for example compressed air, compressed water or the like, with this pressure medium being conducted into the space between two membranes that are part of a plate packet. This makes it possible to exert pressure onto the material to be filtered which is placed on the respective other side of the plates to thus completely separate the material into filtrate and residue.

Such membrane filters constructed of several parts are disclosed, for example, in DE-OS 1,960,821. They have the advantage that, for purposes of cleaning or exchange of the filter cloth or the membrane, they can easily be separated into individual parts. The advantage of the easy disassembly, however, is associated in many prior art embodiments with the drawback that such plates are susceptible to a malfunction which is particularly noticeable if the plates, when installed in the press, are charged with pressure medium without the plate packets having previously been braced sufficiently. Moreover, during use of the plates the individual parts expand and shrink to different degrees so that during exchange of the membranes and reassembly, it may become difficult to properly fit the parts together.

SUMMARY OF THE INVENTION

It is the object of the invention to further develop the prior art, multi-part membrane filter plates in such a way that in the case of insufficient bracing, the pressure of the injected pressure medium, i.e. the compressed air or the compressed water, will be reduced automatically.

The solution of this problem is based on a membrane filter plate for filter presses including the following known features:

either a membrane holding frame or a membrane holding plate;

at least one membrane fastened to the membrane holding frame or the membrane holding plate;

each membrane having an associated covering frame;

each membrane/covering frame combination having an associated filter cloth; and each membrane edge having a dovetail-shaped cross section and its dovetailed region engages in corresponding dovetailed recesses of the membrane holding frame or membrane holding plate;

wherein the membrane holding frame or the frame region of the membrane holding plate and the at least one covering frame together form the frame packet of the membrane filter plate in which one corner region is additionally provided with perforations which form the slurry inlet and the filtrate outlet.

The solution of the problem at hand is characterized by the following features:

each membrane edge is provided with a flute in the dovetailed region; and the covering frame is provided with a projection at locations corresponding with a flute which, in the assembled state, engages in the flute.

In this way, a simple snap-in closure is created which securely connects the membrane and possibly also the filter cloth with the membrane holding frame or the membrane holding plate while also serving as an automatic ventilation or relaxation valve if the plate and membrane packet is compressed only slightly.

To make the structure even more suitable for automatic ventilation and for automatic pressure reduction, it is proposed to provide channels in the membrane holding frame or in the frame portion of the membrane holding plate to connect the pressure medium chamber with the outside air, with such channels extending beyond the dovetailed recess in the frame member. A further improvement can be realized in that the bottom of this recess is made slightly deeper in the direction of the frame member.

The multi-part membrane filter plates of the described type can easily be disassembled into their individual parts and reassembled again. This is particularly applicable in the case where the dovetailed-like recesses together with projections on the covering frames are configured as snap-in closures. In this case, the flute-like dovetailed membrane edges can easily be placed into the corresponding recesses of the respective frame member since the flute structure makes them flexible. Then, covering frames equipped with projections can be pressed on to fill the flutes and stabilize the entire arrangement. The thus prepared individual plates are then connected in series, in a known manner, to form packets and are inserted into the filter press. Upon completion of the packet, the plates are pressed against one another so that each plate is sealed against the other and the packet is combined into a functional unit. Once the pressing together of the plate packet has been properly accomplished, all points to be sealed are closed and the filter press is able to operate properly. If the compression of the filter packet is interfered with and the unit is inadvertently put under operating pressure, it is possible with the prior art embodiments of such plates that the membranes and the filter cloths are torn out of their mounts and operating malfunctions occur. The proposed arrangement eliminates this source of malfunction in that in this case the snap-in connection acts as a check valve so that there will immediately be a pressure reduction and thus an indication of the malfunction.

The proposed stabilization has approximately the same beneficial effect in all edge regions of the plate packet. Only in some embodiments malfunctions may occur in the region of the slurry intake openings which are generally disposed in the corner regions of the plate packet, since the closing force of the press acts essentially on the large-area frame members and sometimes falls below tolerable minimum values in those regions which lie between the slurry inlet openings and the filter chambers. To overcome this difficulty, it is proposed as a further feature of the invention that the covering frames are cut out in the corner regions of the slurry inlet and a round section is inserted into each corresponding region of the flutes in the membrane frames, with these round sections being either integrated in a cloth screwing means or being individually clamped, e.g. screwed, directly to the basic membrane body or also to one another.

BRIEF DESCRIPTION OF THE DRAWINGS

The invention will now be described in greater detail with reference to the attached drawing figures. It is shown in.

DETAILED DESCRIPTION OF THE PREFERRED EMBODIMENTS

Figure 1:
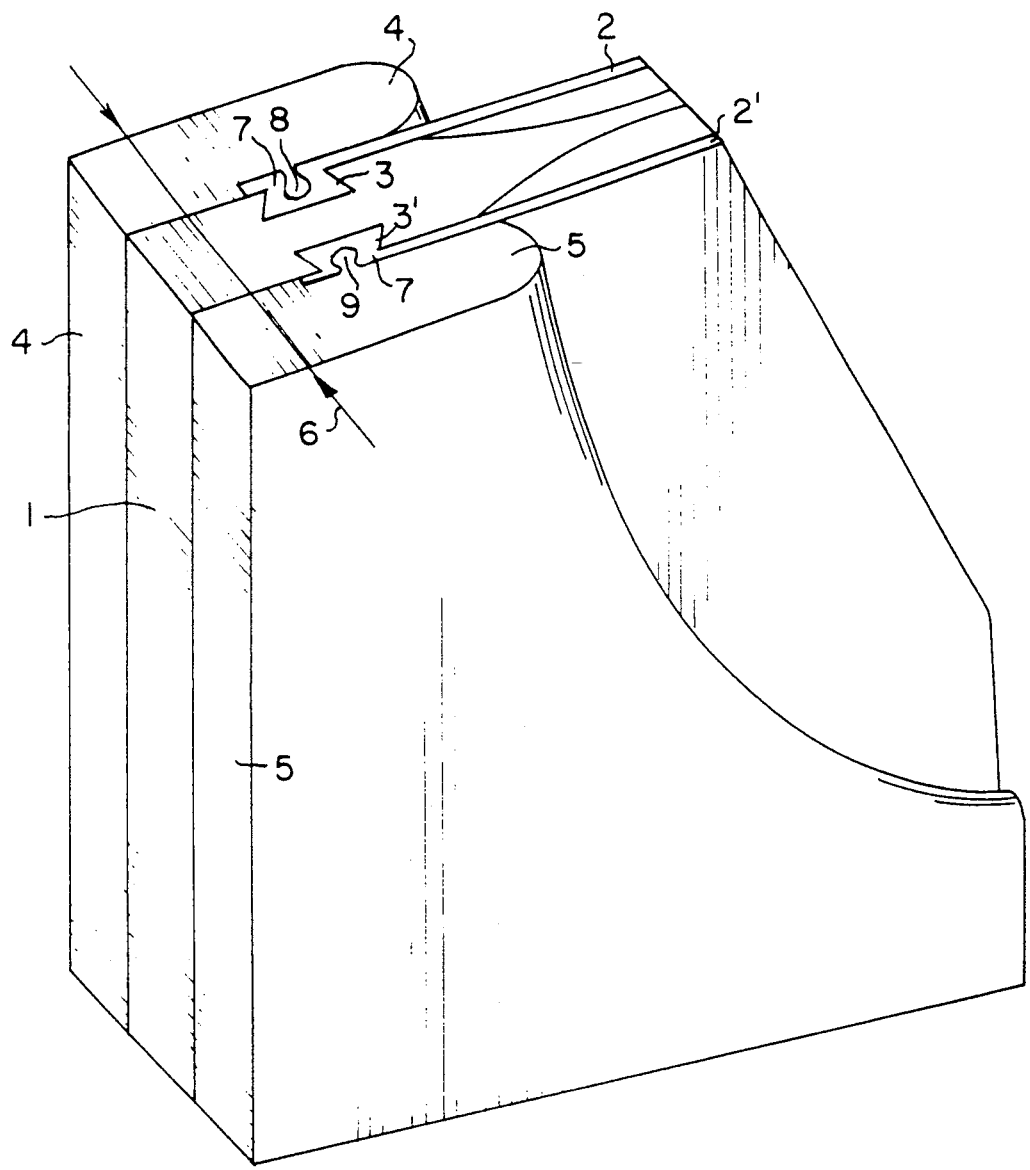
FIG. 1 is a partial perspective sectional view of an embodiment of a five-part membrane filter plate.

FIG. 1 is a simplified perspective view of a multi-part membrane filter plate. The simplification resides in that all inlet and outlet channels have been omitted as well as the required seals which seal the plates against one another and finally also the surface structures of the membranes; that is, all features which are not necessary for an understanding of the invention. The illustrated membrane filter plate is essentially composed of a membrane holding frame 1 which is conventionally configured as a central frame and to which a membrane 2, 2' is fastened at each side. Instead of the membrane holding frame, a membrane holding plate, of course, could be used in the embodiment of FIG. 1.

The edges of membranes 2, 2' are given a dovetailed shape and engage in a corresponding dovetailed recess 3, 3' in membrane holding frame 1 or membrane holding plate. Covering frames 4, 5 are provided to clamp in the membranes so that the unit as a whole in this form is composed of a five-layer packet. After several of these packets are installed in the frame of the filter press, the packets are compressed in the direction of the double arrow 6 and are sealed against one another.

In its dovetailed region, the membrane edge is provided with a flute 7 which makes this membrane region elastically deformable and therefore easily insertable into the corresponding recess of membrane holding frame 1 or the membrane holding plate. At their locations which correspond to flute 7, covering frames 4, 5 are provided with projections 8 or 9, respectively, which, in the assembled state, engage in the flutes. The flute is thus filled with non-compressible material so that the membrane is now firmly held in its dovetailed support. The entire arrangement is preferably configured as a snap-in closure, i.e. the sizes of the mentioned shapes are matched to one another in such a manner that, under consideration of the thickness of the membrane, the parts slide into one another under slight pressure and then remain in this position.

Figure 2:
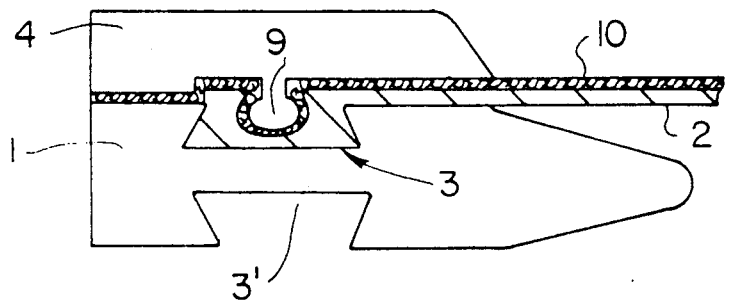
FIG. 2 is a simplified cross-sectional view of the membrane filter plate according to FIG. 1.

It is advantageous if in addition to membranes 2, 2', the filter cloths which cover the membranes on the slurry side when the device is in operation are also secured in this manner. In this case, an arrangement results as it is shown schematically in FIG. 2 where the filter cloth is marked 10.

Figure 3:
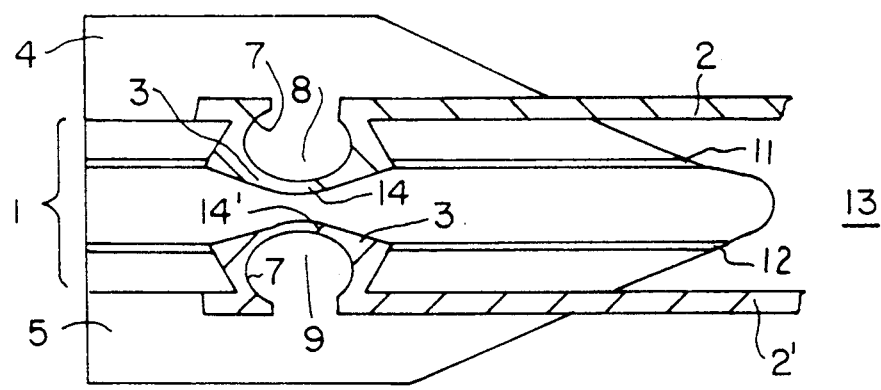
FIG. 3 is a cross-sectional view similar to FIG. 2 of another embodiment having additional ventilation channels.
Figure 4:
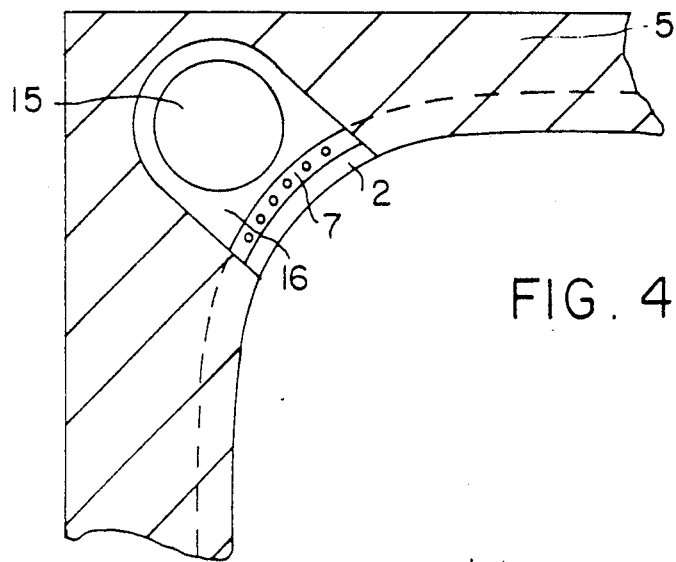
FIG. 4 is a top view of a corner region of the filter plate illustrated in FIG. 1.
Figure 6:
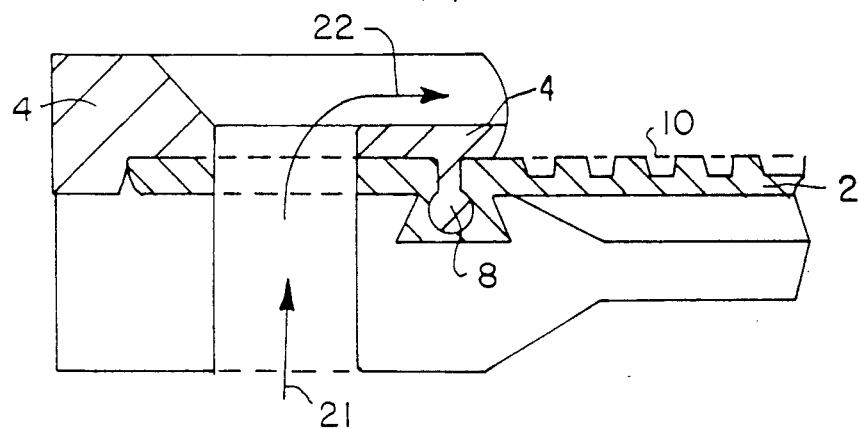
FIG. 6 is a detailed cross-sectional view of a modified corner region of the plate.
Figure 6:
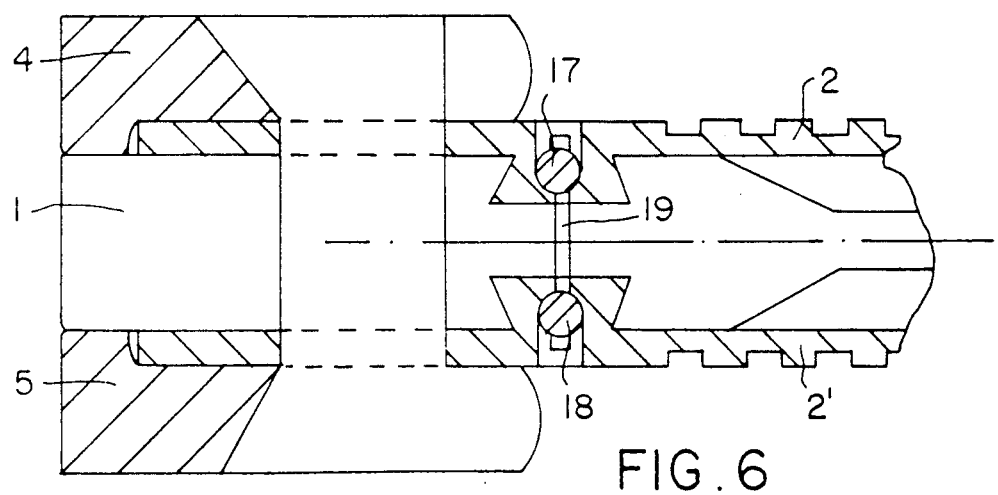

FIG. 3 illustrates the features of a further embodiment. Here again a membrane holding frame 1 is provided into which dovetailed recesses are worked. The likewise dovetailed edge of membranes 2 or 2', respectively is inserted into these recesses, with the filter cloth not being shown for the sake of simplicity. The dovetailed membrane edges are provided with flutes 7 into which engage projections 8, 9 of covering frames 4, 5. In addition, channels 11, 12 are provided which connect the pressure medium chamber 13 of the filter plate with the outside air and which lead to recesses 3, 3'. It can also be seen in FIG. 3 that the respective bottom 14, 14' of the recess is made slightly deeper in the direction toward the center of the membrane holding frame. If it now happens that, during assembly of the filter plate packet, the closing pressure inadvertently is too low and pressure medium chamber 13 is charged with pressure medium, this pressure medium is able to escape to the outside through channels 11, 12, thus lifting membrane 2 or 2', respectively, from the bottoms 14 or 14', respectively, in the manner of a valve. If, however, the closing pressure is sufficiently high and thus the compressive pressure in the region of bottoms 14, 14' is greater, the internal pressure in pressure medium chamber 13 is not reduced. As shown in FIG. 4, a slurry inlet 15 is worked into the illustrated corner region. Covering frame 5 (and also the non-illustrated covering frame 4) is cut out in this corner region of the slurry inlet 15 so that a free area 16 is created so that membrane 2 or 2', respectively, is visible therebelow. In this region, a round section 17, 18 is inserted into each flute 7 of the membrane frames, with the two oppositely disposed round sections 17 and 18—see FIG. 6—being screwed together by means of screws 19. The consequence of this measure is that in this cut out corner region the membranes sealingly engage with the dovetailed recesses of membrane holding frame 1. The round sections could also be a screw connecting a filter cloth to a membrane. Alternatively, the round sections can be individually clamped or screwed directly to the membrane body.

Figure 5:
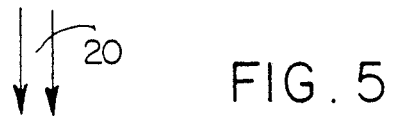
FIG. 5 is an enlarged cross-sectional view of the corner region shown in FIG. 4.

As can be seen in FIG. 5 the closing force of the filter press acts in the direction of double arrows 20. The suspension to be filtered flows in as indicated by arrow 21, with the suspension then pouring into the filter chambers as shown by arrow 22.

I claim:
1. In a membrane filter plate for filter presses comprising:
a membrane holding frame having a dovetailed recess; a membrane fastened to the membrane holding frame; a covering frame attached to the membrane; a filter cloth connected to at least one of the membrane and covering frame; wherein the membrane has an edge provided with a dovetailed-shaped projection which engages with the dovetailed recess of the membrane holding frame; and the membrane holding frame and the covering frame together form a frame packet of the membrane filter plate and perforations are provided in one corner region of the frame packet to form a slurry inlet and filtrate outlet, the improvement wherein:
a flute is provided in the dovetailed-shaped projection; and the covering frame is provided with a projection received within said flute.

2. A membrane filter plate according to claim 1, wherein the dovetailed recess of the membrane holding frame and said projection of the covering frame cooperate to provide a clamping closure for the connection of the membrane holding frame with the covering frame through the intermediary of the membrane.

3. A membrane filter plate according to claim 1, further comprising channels extending through the membrane holding frame and connecting a pressure medium chamber of the membrane filter plate with the outside air, said channels extending from an outside edge of the membrane holding frame beyond the dovetailed recess.

4. A membrane filter plate according to claim 3, wherein the bottom of the dovetailed recess of the membrane holding frame is made slightly deeper than the dovetailed-shaped projection of the membrane.

5. A membrane filter plate according to claim 1, further comprising:

a cut-out recess in the corner region of the covering frame having the slurry inlet;

a round section, said round section being inserted in said flute of the membrane in the corner region, and means for fastening said round section to the membrane holding frame, wherein said fastened round section engages with the dovetailed-shaped projection of the membrane in the corner region.

6. A membrane filter plate according to claim 1, wherein the membrane holding frame is a membrane holding plate.

7. A membrane filter plate according to claim 2, wherein both the membrane and filter cloth are clamped between the dovetailed recess of the membrane holding frame and the projection of the covering frame.

* * * * *